United States Patent
Pandolfo (10) Patent No.: US 9,395,923 B1
(45) Date of Patent: Jul. 19, 2016

(54) METHOD AND SYSTEM FOR RECOVERING FROM EMBEDDED ERRORS FROM WRITING DATA TO STREAMING MEDIA

(71) Applicant: EMC Corporation, Hopkinton, MA (US)

(72) Inventor: Michael Pandolfo, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 301 days.

(21) Appl. No.: 14/039,891

(22) Filed: Sep. 27, 2013

(51) Int. Cl.
*G06F 12/00* (2006.01)
*G06F 3/06* (2006.01)

(52) U.S. Cl.
CPC .............. *G06F 3/0619* (2013.01); *G06F 3/065* (2013.01); *G06F 3/0682* (2013.01)

(58) Field of Classification Search
None
See application file for complete search history.

(56) References Cited

U.S. PATENT DOCUMENTS

| 2005/0108470 | A1* | 5/2005 | Gold | G06F 3/0617 711/111 |
| 2005/0125557 | A1* | 6/2005 | Vasudevan | G06F 11/2041 709/239 |

* cited by examiner

*Primary Examiner* — Baboucarr Faal
(74) *Attorney, Agent, or Firm* — Dergosits & Noah LLP; Todd A. Noah (57) ABSTRACT

Recovering from embedded errors from writing data to streaming media is described. An intent of an application to write data to a first streaming medium is identified. A copy of the data is written to an alternative storage device concurrent with the application writing the data to the first streaming medium. A determination is made whether an embedded error occurred while writing the data to the first streaming medium. The copy of the data is written from the alternative storage device to a second streaming medium in response to a determination that the embedded error occurred while writing the data to the first streaming medium.

20 Claims, 3 Drawing Sheets

METHOD AND SYSTEM FOR RECOVERING FROM EMBEDDED ERRORS FROM WRITING DATA TO STREAMING MEDIA

BACKGROUND

Streaming media includes magnetic tape, which is a medium for magnetic recording that is made of a thin magnetizable coating on a long narrow strip of plastic film. A device that stores computer data on magnetic tape may be referred to as a tape drive, a tape unit, or a streamer. Magnetic tape was a key technology in early computer development, allowing significant amounts of data to be mechanically created, stored for long periods, and to be rapidly accessed. Although other later-developed technologies can perform the functions of magnetic tape, and some of these other technologies are replacing magnetic tape, innovation in the magnetic tape technology continues and magnetic tape is still used.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Embedded data transmission errors are those errors which cause data loss while data is written to a streaming medium, such as a tape drive, and which are not detectable by an application writing the data. An embedded error can be identified at any time that the data stream "rests," such as after the writing of an end-of-file mark. However, after embedded errors are detected, prior art embedded error detection methods cannot recover the data written anytime from the beginning writing data to a streaming medium to the writing of the end-of-file mark. The data written to a streaming medium that is 99% full can be made unusable by an embedded error as the physical end-of-medium was approached, but the prior art methods can do nothing effective to preserve or reconstitute previously written data. In order to maintain data integrity, prior art methods could break the data stream at each data write, continuously querying the streaming medium as to the success of each data write, but continuous querying effectively renders the writing of data to a streaming medium impractical and thereby nullifies an advantage of employing a streaming medium. Prior art methods of detecting embedded errors can only identify the data written to the streaming medium as unusable.

Embodiments herein enable recovering from embedded errors from writing data to streaming media. An intent of an application to write data to a first streaming medium is identified. For example, an error recovery application identifies that a backup application is scheduled to write a clone file to a tape drive. A copy of the data is written to an alternative storage device concurrent with the application writing the data to the first streaming medium. For example, the error recovery application writes a copy of the clone file to a volume of a hard disk drive. A determination is made whether an embedded error occurred while writing the data to the first streaming medium. For example, the error recovery application determines whether an embedded error occurred by validating the tape drive's label block and verifying the block count stored by the tape drive. The copy of the data is written from the alternative storage device to a second streaming medium in response to a determination that the embedded error occurred while writing the data to the first streaming medium. For example, if the error recovery application detects an embedded error, the error recovery application writes the copy of the clone data from the volume of the hard disk drive to either the tape drive or another tape drive. The error recovery application reconstitutes data previously written to a streaming medium without continuously querying the streaming medium as to the success of each data write, which would have effectively rendered the writing of data to a streaming medium impractical, and without interfering with the operation of the application that wrote the data to the streaming medium.

Figure 1:
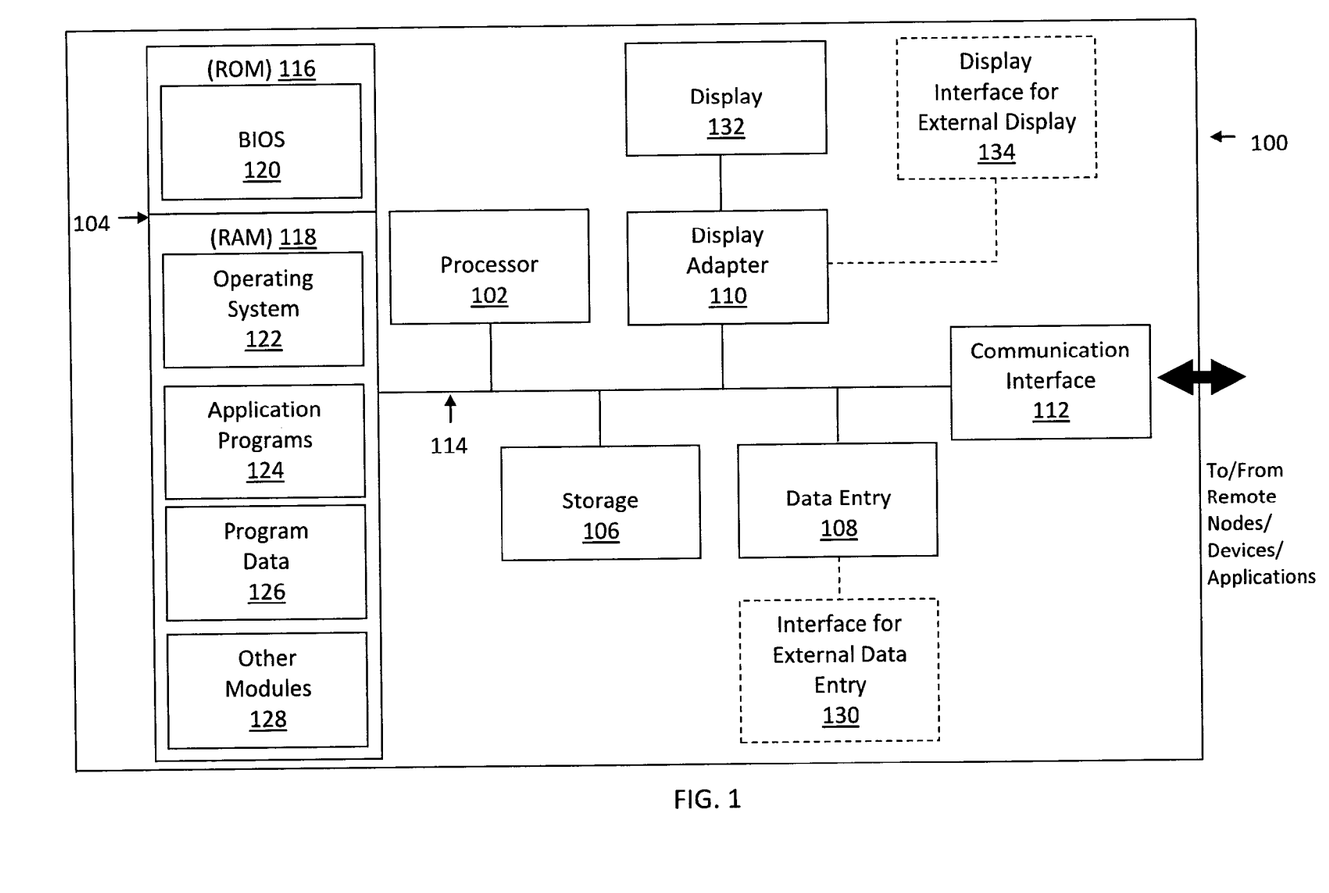
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for recovering from embedded errors from writing data to streaming media.

Prior art embedded error detection methods cannot recover the data written anytime from the beginning writing data to a streaming medium to the writing of an end-of-file mark. In order to maintain data integrity, prior art methods could break the data stream at each data write, continuously querying the streaming medium as to the success of each data write, but this continuous querying would effectively render the writing of data to a streaming medium impractical and thereby nullify an advantage of employing a streaming medium. Prior art methods of detecting embedded errors can only identify the data written to the streaming medium as unusable. Embodiments herein enable recovering from embedded errors from writing data to streaming media. The error recovery application reconstitutes data previously written to a streaming medium without continuously querying the streaming medium as to the success of each data write, which would have effectively rendered the writing of data to a streaming medium impractical, and without interfering with the operation of the application that wrote the data to the streaming medium.

Figure 2:
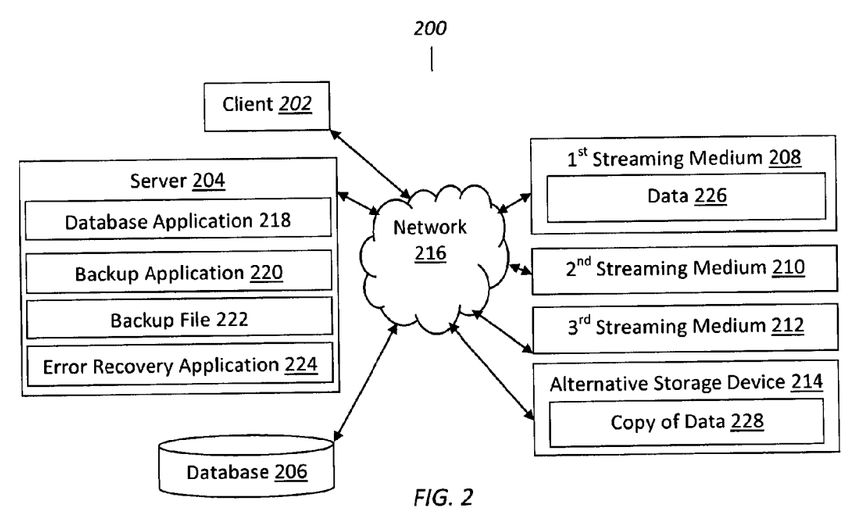
FIG. 2 illustrates a block diagram of an example system for recovering from embedded errors from writing data to streaming media, under an embodiment.

FIG. 2 illustrates a block diagram of a system for recovering from embedded errors from writing data to streaming media, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202, and a server 204 which is provided by a hosting company, and which is associated with a database 206. The system 200 also includes a first streaming medium 208, a second streaming medium 210, a third streaming medium 212, and an alternative storage device 214. The streaming media 208-212 may be referred to as the tape drives 208-212. The alternative storage device 214 may be referred to as the volume of rotating medium 214, the volume of the hard disk drive 214, or the fourth tape drive 214. The client 202, the server 204, the database 206, the streaming media 208-212, and the alternative storage device 216 communicate via a network 216. Although FIG. 2 depicts the system 200 with one client 202, one server 204, one database 206, three streaming media 208-212, one alternative storage device 214, and one network 216, the system 200 may include any number of clients 202, servers 204, databases 206, streaming media 208-212, alternative storage devices 214, and networks 216. The client 202 and the server 204 may each be substantially similar to the system 100 depicted in FIG. 1.

The client 202 enables a user to access a database management system as a system user. The server 208 includes a database application 218 that executes to implement the database management system, a backup application 220 that manages backup and recovery for the database 206, and a backup file 222 that may be an image copy of data files or a proprietary format file that includes parts or all of multiple data files for the database 206. Although the following examples describe situations in which the backup application 220 writes data to the streaming media 208-212, embodiments enable recovering from embedded errors from writing data to streaming media for any application, such as the database application 218 writing data to the streaming media 208-212.

The backup application 220, such as a NetWorker® backup application, creates the backup file 222. EMC Corporation's NetWorker® backup application is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environment. Add-on database and application modules provide backup services for products such as Oracle. Client backup data can be sent to a remote NetWorker® storage node or stored on a locally attached device by the use of a dedicated storage node. EMC Corporation's NetWorker® modules for Databases and Applications supports cross platforms products such as Oracle, IBM and DB2 servers.

The backup application 220 can store the data 226, which may referred to the clone file 226 of the backup file 222, on an external destination node including an external disk and/or a tape, such as the tape drives 208-212. For example, the backup application 232 stores the data 226 on the first tape drive 208, which is associated with the server 204, thereby protecting the clone file 226 made of the backup file 222 even if the database 206 and/or the backup file 222 stored on a disk associated with the server 204 is corrupted. A backup administrator may use the backup application 220 to specify the options for the data 226 to be encrypted, deduplicated, and/or compressed while being transmitted from a source, and the options for data 226 to be decrypted and/or decompressed when stored on the tape drives 208-212. Data deduplication significantly reduces storage time by only storing unique daily changes, while always maintaining data of full backup files for an immediate single-step restore. The transmission of deduplicated data sends only changed blocks, thereby reducing network traffic.

A database administrator may select to execute a manual rollback to restore the database 206 based on a certain checkpoint selected by the database administrator. The backup application 220 may typically select to restore the database 206 from the backup file 222 stored on a disk associated with the server 204. However, if the backup application 220 determines that the backup file 222 stored on a disk associated with the server 204 is corrupted or absent, the backup application 220 recovers the data 226 from the tape drives 208-212, and restores the clone file 226 made of the backup file 222 to the corrupted database 206.

The server 204 also includes an error recovery application 224 that can reconstitute data previously written to the tape drives 208-212. The database application 218 and/or the backup application 220 may write the data 226 to the tape drives 208-212 and/or write a copy of data 228, which may be referred to as the copy of the clone file 228, to the volume of the hard disk drive 214. FIG. 2 depicts the system elements 218-224 residing completely on the server 204. However, the system elements 218-224 may reside in any combination of partially on the server 204 and partially on other servers that are not depicted in FIG. 2.

The error recovery application 224 identifies the intent of an application to write data to a first streaming medium. For example, the error recovery application 224 identifies that the backup application 220 is scheduled to write the clone file 226 to the first tape drive 208, or has been instructed to write the clone file 226 to the first tape drive 208.

The error recovery application 224 writes a copy of data to an alternative storage device concurrent with an application writing the data to a first streaming medium. For example, the error recovery application 224 mirrors the writing of the clone file 226 to the first tape drive 208 by writing the copy of the clone file 228 to the volume of the hard disk drive 214.

An alternative storage device stores a copy of data. For example, the volume of the hard disk drive 214, which is specifically paired to the first tape drive 208, stores the copy of the clone file 228. The volume of the hard disk drive 214 may store the copy of the clone file 228 using a data deduplication algorithm to store a deduplicated copy of the clone file 228, which improves the storage efficiency of the volume of the hard disk drive 214. Deduplication enables a smaller amount of the volume of the hard disk drive 214 to be allocated to parallel the data storage of the first tape drive 208. The allocation may also be based on the native storage capacity of uncompressed data, such as 3.2 terabytes of uncompressed data storage combined with a 50% storage reduction due to compression resulting in 6.4 terabytes of compressed data storage capacity on the first tape drive 208. In this example, 6.4 terabytes of uncompressed data may be allocated for the volume of the hard disk drive 214 to parallel the data storage of the first tape drive 208.

The error recovery application 224 determines whether an embedded error occurred while writing data to a first streaming medium. For example, after the backup application 220 writes the clone file 226 to the first tape drive 208 and writes an end-of-file marker to the first tape drive 208, the error recovery application 224 determines whether an embedded error occurred by validating the first tape drive's label block and verifying the block count stored by the first tape drive 208. One example of an embedded error occurs when a tape drive erroneously stops writing data to a magnetic tape, erroneously reverses the magnetic tape back to the beginning of the magnetic tape, and then resumes writing data to the magnetic tape, erroneously overwriting previously written data. If a tape drive fills a magnetic tape with written data after erroneously reversing and overwriting, the error recovery application 224 may reconstitute the mirrored data by writing the data stored on an alternative storage device to multiple tape drives. Other examples of determining whether an embedded error occurred while writing data to a streaming medium include inspection of tape drive log pages to discover recorded tape drive commands that were not sent by the backup application, and comparing the record position of the terminating record in the alternative storage device against a streaming medium's reported record position upon reaching the end of the backup application's operation or the encounter of an end-of-tape event, whichever occurs first.

The error recovery application 224 writes a copy of data from an alternative storage device to a second streaming medium if an embedded error occurred while writing data to a first streaming medium. For example, if the error recovery application 224 detects an embedded error occurred while writing data to the first tape drive 208, the error recovery application 224 reconstitutes the erroneously written data by writing the copy of the clone file 228, in its entirety, from the volume of the hard disk drive 214 to either the first tape drive 208 or the second tape drive 210. In this situation, the error recovery application 224 may write the first tape drive 208 as an attempt to retry the original data writing, or write to the second tape drive 210 instead. If an alternative storage device stores a copy of data that is larger than a streaming medium's storage capacity, the error recovery application 224 writes the data that the streaming medium cannot hold to another streaming medium. If the error recovery application 224 writes the copy of the data to more than one streaming medium, the error recovery application 224 informs the application that wrote the data to the initial streaming medium. This is the only instance in which the application receives an indication that an alternative storage device was used.

The error recovery application 224 may reconstitute the erroneously written data by using a small cache of mirror streams to synchronize the volume of the hard disk drive 214 with either the first tape drive 208 or the second tape drive 210. The cache of streaming data is an optimization for the error recovery application 224 in the same way that data deduplication is an optimization—it is not necessary, but it improves system efficiency. The cache is specifically used when a tape is successfully written and ejected, but has sufficient remaining capacity so as to be called for during a subsequent backup. In this case, when the tape is called for and becomes the data 226 in the first streaming medium 208, the alternative storage device must be pre-loaded to equal the data 226. This can be performed in a straightforward, but highly inefficient, manner by copying all of the data 226 into the copy of data 228. Alternatively, the error recovery application 224 can manage a cache of archived copy of data 228 images from partially written tapes, and utilize this cached copy to become the preloaded data 228.

The error recovery application 224 may delete a copy of data from an alternative storage device if no embedded error was detected after an application wrote data to a streaming medium. For example, if the error recovery application 224 detects no embedded error after the backup application 220 wrote the clone file 226 to the first tape drive 208, the error recovery application 224 deletes the copy of the clone file 228 from the volume of the hard disk drive 214 because the copy of the clone file 228 is no longer needed to reconstitute data, and the deletion enables the volume of the hard disk drive 214 to mirror the subsequent writing of data to the tape drives 208-212.

The error recovery application 224 may determine whether an embedded error occurred while writing data to a second streaming medium in an effort to reconstitute lost data. For example, the error recovery application 224 determines whether an embedded error occurred while attempting to reconstitute lost data through the writing of the copy of the clone file 228 to the first tape drive 208 or the second tape drive 210 by validating the tape drive's label block and verifying the block count stored by the first tape drive 208 or the second tape drive 210. The error recovery application 224 may make a second attempt to reconstitute lost data by writing a copy of data from an alternative storage device to a third streaming medium if an embedded error occurred while writing data to a second streaming medium. For example, if the error recovery application 224 detects an embedded error occurred during the first attempt to reconstitute lost data, the error recovery application 224 makes a second attempt to reconstitute the lost data by writing the copy of the clone file 228 from the volume of the hard disk drive 214 to either the second tape drive 210 or the third tape drive 212. The error recovery application 224 may delete a copy of data from an alternative storage device if a second attempt to reconstitute the lost data was successful. For example, if the error recovery application 224 detects no embedded error during the second attempt to reconstitute the lost data, the error recovery application 224 deletes the copy of the clone file 228 from the volume of the hard disk drive 214 because the copy of the clone file 228 is no longer needed to reconstitute data, and the deletion enables the volume of the hard disk drive 214 to mirror the subsequent writing of data to the tape drives 208-212. The error recovery application 224 may make any number of additional attempts to reconstitute lost data and verify that the additional attempts to reconstitute the lost data were successful.

The error recovery application 224 does not require an application to recover from embedded errors by writing a virtual tape, which would require the application to manage and register another entity, which would create the overhead of bookkeeping and cleanup, which can be prone to errors. The recovery process does not interfere with the application's normal operations, such as if the backup application 220 was required to interrupt the creation of other regularly scheduled clone copies to rewrite the clone copy 226 to the first tape drive 208 upon the detection of an embedded error. The application does not have to be aware of the alternative storage device other than at the device level, and the operating system that executes the application can easily manage the operation of the alternative storage device.

Figure 3:
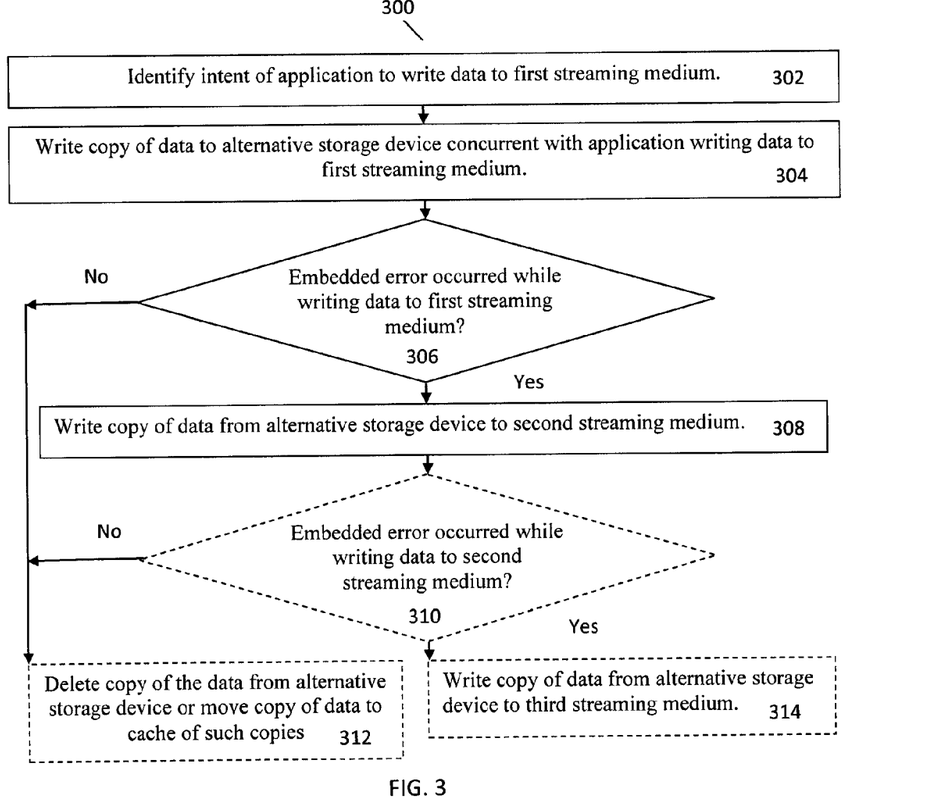
FIG. 3 is a flowchart that illustrates a method of recovering from embedded errors from writing data to streaming media, under an embodiment.

FIG. 3 is a flowchart that illustrates a method of recovering from embedded errors from writing data to streaming media. Flowchart 300 illustrates method acts illustrated as flowchart blocks for certain steps involved in and/or between the client 202 and/or the server 204 of FIG. 2.

An intent of an application to write data to a first streaming medium is identified, act 302. For example, the error recovery application 224 identifies that the backup application 220 is scheduled to write the clone file 226 to the first tape drive 208.

A copy of data is written to an alternative storage device concurrent with an application writing the data to a first streaming medium, act 304. For example, the error recovery application 224 writes the copy of the clone file 228 to the volume of a hard disk drive 214.

A determination is made whether an embedded error occurred while writing data to a first streaming medium, act 306. For example, the error recovery application 224 determines whether an embedded error occurs by validating the first tape drive's label block and verifying the block count stored by the first tape drive 208. If an embedded error occurred while writing data to a first streaming medium, the flowchart 300 continues to act 308. If no embedded error occurred while writing data to a first streaming medium, the flowchart 300 proceeds to act 312.

A copy of data is written from an alternative storage device to a second streaming medium in response to a determination that an embedded error occurred while writing data to a first streaming medium, act 308. For example, if the error recovery application 224 detects an embedded error, the error recovery application 224 writes the copy of the clone file 228 from the volume of the hard disk drive 214 to either the first tape drive 208 or the second tape drive 210.

A determination is optionally made whether an embedded error occurred while writing data to a second streaming medium, act 310. For example, the error recovery application 224 determines whether an embedded error occurred by validating the tape drive's label block and verifying the block count stored by the first tape drive 208 or the second tape drive 210. If no embedded error occurred while writing data to a second streaming medium, the flowchart 300 continues to act 312. If an embedded error occurred while writing data to a second streaming medium, the flowchart 300 proceeds to act 314.

A copy of data is optionally deleted from an alternative storage device or the copy of data is optionally moved to a cache of such copies, act 312. For example, if the error recovery application 224 detects no embedded error, the error recovery application 224 deletes the copy of the clone file 228 from the volume of the hard disk drive 214, and the flowchart 300 terminates. In another example, if the error recovery application 224 detects no embedded error, the error recovery application 224 moves the copy of the clone file 228 from the volume of the hard disk drive 214 to a cache of such copies, and the flowchart 300 terminates, A copy of data is optionally written from an alternative storage device to a third streaming medium in response to a determination that an embedded error occurred while writing data to a second streaming medium, act 314. For example, if the error recovery application 224 detects an embedded error, the error recovery application 224 writes the copy of the clone file 228 from the volume of the hard disk drive 214 to either the second tape drive 210 or the third tape drive 212, and the flowchart 300 terminates.

Although FIG. 3 depicts the acts 302-314 occurring in a specific order, the acts 302-314 may occur in another order, and each of the acts 302-314 may be repeated as needed. Executing the flowchart 300 enables recovering from embedded errors from writing data to streaming media. The error recovery application 224 reconstitutes data previously written to a streaming medium without continuously querying the streaming medium as to the success of each data write, which would have effectively rendered the writing of data to a streaming medium impractical, and without interfering with the operation of the application that wrote the data to the streaming medium.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for recovering from embedded errors from writing data to streaming media, the system comprising:
   one or more processors;
   a processor-based application stored on a non-transitory computer readable medium including a plurality of instructions, which when executed on a computer, will cause the one or more processors to:
   identify an intent of an application to write data to a first streaming medium;
   write a copy of the data to an alternative storage device concurrent with the application writing the data to the first streaming medium;
   determine whether an embedded error occurred while writing the data to the first streaming medium; and
   write the copy of the data from the alternative storage device to a second streaming medium in response to a determination that the embedded error occurred while writing the data to the first streaming medium.

2. The system of claim 1, wherein storing the copy of the data to the alternative storage device comprises using a data deduplication algorithm to store a deduplicated copy of the data to the alternative storage device.

3. The system of claim 1, wherein the alternative storage device comprises one of a volume of rotating medium and another streaming medium.

4. The system of claim 1, wherein determining whether the embedded error occurred while writing the data to the first streaming medium comprises at least one of validation of a medium label block and verification of a block count stored on the first streaming medium.

5. The system of claim 1, wherein at least one of the first streaming medium and the second streaming medium comprises a tape drive.

6. The system of claim 1, wherein the processor-based application includes further instructions to one of delete the copy of the data from the alternative storage device and move the copy of the data to a cache of such copies in response to a determination that no embedded error occurred while writing the data to the first streaming medium.

7. The system of claim 1, wherein the processor-based application includes further instructions to:
   determine whether the embedded error occurred while writing the copy of the data from the alternative storage device to the second streaming medium;
   write the copy of the data from the alternative storage device to a third streaming medium in response to a determination that the embedded error occurred while writing the copy of the data from the alternative storage device to the second streaming medium; and
   one of delete the copy of the data from the alternative storage device and move the copy of the data to a cache of such copies in response to a determination that no embedded error occurred while writing the copy of the data to the second streaming medium.

8. A computer-implemented method for recovering from embedded errors from writing data to streaming media, the method comprising:
   identifying an intent of an application to write data to a first streaming medium;
   writing a copy of the data to an alternative storage device concurrent with the application writing the data to the first streaming medium;
   determining whether an embedded error occurred while writing the data to the first streaming medium; and
   writing the copy of the data from the alternative storage device to a second streaming medium in response to a determination that the embedded error occurred while writing the data to the first streaming medium.

9. The method of claim 8, wherein storing the copy of the data to the alternative storage device comprises using a data deduplication algorithm to store a deduplicated copy of the data to the alternative storage device.

10. The method of claim 8, wherein the alternative storage device comprises one of a volume of rotating medium and another streaming medium.

11. The method of claim 8, wherein determining whether the embedded error occurred while writing the data to the first streaming medium comprises at least one of validation of a medium label block and verification of a block count stored on the first streaming medium.

12. The method of claim 8, wherein at least one of the first streaming medium and the second streaming medium comprises a tape drive.

13. The method of claim 8, wherein the method further comprises one of deleting the copy of the data from the alternative storage device and moving the copy of the data to a cache of such copies in response to a determination that no embedded error occurred while writing the data to the first streaming medium.

14. The method of claim 8, wherein the method further comprises:
   determining whether the embedded error occurred while writing the copy of the data from the alternative storage device to the second streaming medium;
   writing the copy of the data from the alternative storage device to a third streaming medium in response to a determination that the embedded error occurred while writing the copy of the data from the alternative storage device to the second streaming medium; and
   one of deleting the copy of the data from the alternative storage device and moving the copy of the data to a cache of such copies in response to a determination that no embedded error occurred while writing the copy of the data to the second streaming medium.

15. A computer program product, comprising a non-transitory computer-readable medium having a computer-readable program code embodied therein to be executed by one or more processors, the program code including instructions to:
   identify an intent of an application to write data to a first streaming medium;
   writing a copy of the data to an alternative storage device concurrent with the application writing the data to the first streaming medium;
   store the copy of the data to the alternative storage device;
   determine whether an embedded error occurred while writing the data to the first streaming medium; and
   write the copy of the data from the alternative storage device to a second streaming medium in response to a determination that the embedded error occurred while writing the data to the first streaming medium.

16. The computer program product of claim 15, wherein storing the copy of the data to the alternative storage device comprises using a data deduplication algorithm to store a deduplicated copy of the data to the alternative storage device.

17. The computer program product of claim 15, wherein the alternative storage device comprises one of a volume of rotating medium and another streaming medium.

18. The computer program product of claim 15, wherein determining whether the embedded error occurred while writing the data to the first streaming medium comprises at least one of validation of a medium label block and verification of a block count stored on the first streaming medium.

19. The computer program product of claim 15, wherein at least one of the first streaming medium and the second streaming medium comprises a tape drive.

20. The computer program product of claim 15, wherein the program code includes further instructions to:

delete the copy of the data from the alternative storage device in response to a determination that no embedded error occurred while writing the data to the first streaming medium;

determine whether the embedded error occurred while writing the copy of the data from the alternative storage device to the second streaming medium;

write the copy of the data from the alternative storage device to a third streaming medium in response to a determination that the embedded error occurred while writing the copy of the data from the alternative storage device to the second streaming medium; and one of deleting the copy of the data from the alternative storage device and moving the copy of the data to a cache of such copies in response to a determination that no embedded error occurred while writing the copy of the data to the second streaming medium.

\* \* \* \* \*